United States Patent
Patel et al.

(10) Patent No.: US 11,916,368 B2
(45) Date of Patent: Feb. 27, 2024

(54) REMOTE ACTIVATION OF COMMUNICATION MODULES OF SELF-POWERED INTELLIGENT ELECTRONIC DEVICES

(71) Applicant: ABB Schweiz AG, Baden (CH)

(72) Inventors: Nishith Patel, Bangalore (IN); Darshit Prajapati, Vadodara (IN); Thomas Kueng, Nussbaumen (CH); Vishal Shah, Bengaluru (IN); Tero Talvitie, Vaasa (FI); Juhani Koivupuro, Vaasa (FI)

(73) Assignee: ABB Schweiz AG, Baden (CH)

( * ) Notice: Subject to any disclaimer, the term of this patent is extended or adjusted under 35 U.S.C. 154(b) by 372 days.

(21) Appl. No.: 17/298,469

(22) PCT Filed: Nov. 28, 2019

(86) PCT No.: PCT/IB2019/060278
§ 371 (c)(1),
(2) Date: May 28, 2021

(87) PCT Pub. No.: WO2020/110060
PCT Pub. Date: Jun. 4, 2020

(65) Prior Publication Data
US 2022/0029407 A1    Jan. 27, 2022

(30) Foreign Application Priority Data
Nov. 29, 2018   (IN) .............................. 201841045086

(51) Int. Cl.
*H02H 3/08*   (2006.01)
*H02H 1/00*   (2006.01)
*H02H 3/06*   (2006.01)

(52) U.S. Cl.
CPC ............ *H02H 3/08* (2013.01); *H02H 1/0007* (2013.01); *H02H 3/06* (2013.01)

(58) Field of Classification Search
CPC ........... H02J 13/00001–00006; H02H 1/0061; H02H 1/0069; H02H 7/22; H02H 7/26–30; H02H 3/06; H02H 3/08
See application file for complete search history.

(56) References Cited

U.S. PATENT DOCUMENTS 6,002,260 A   12/1999   Lau et al.
8,760,825 B2   6/2014   Erger et al.
(Continued)

FOREIGN PATENT DOCUMENTS

EP   2040084 A1   3/2009

OTHER PUBLICATIONS

European Patent Office, International Search Report for PCT/IB2019/060278, dated Apr. 1, 2020, 3 pages.
(Continued)

*Primary Examiner* — Jared Fureman
*Assistant Examiner* — Christopher J Clark
(74) *Attorney, Agent, or Firm* — Leydig, Voit & Mayer, Ltd.

(57) ABSTRACT

The invention relates to remote activation of a communication module of a self-powered intelligent electronic device (IED). The IED controls an auto recloser mounted on an electric pole of a power distribution network. A controller of the IED, receives an activation signal from a trigger source, positioned within a predefined distance from the IED, through an optical sensor to activate the communication module. A control signal is generated, upon the controller of the IED detecting the activation signal, for powering the communication module from a power supply module. The power supply module is enabled to power the communica- (Continued)

tion module for a duration controlled with the control signal. The communication module is activated for communicating a plurality of data associated with the IED to a remote communication device upon enabling the power supply module for the communication module.

11 Claims, 4 Drawing Sheets

(56) References Cited

U.S. PATENT DOCUMENTS

| | | | |
|---|---|---|---|
| 2007/0268644 A1* | 11/2007 | Schweitzer | H02H 3/042 |
| | | | 361/115 |
| 2009/0079417 A1 | 3/2009 | Mort et al. | |
| 2013/0329331 A1* | 12/2013 | Erger | H01H 9/168 |
| | | | 361/102 |
| 2017/0126016 A1* | 5/2017 | Andrews | H02J 13/00004 |
| 2017/0328945 A1 | 11/2017 | Achanta | |

OTHER PUBLICATIONS

European Patent Office, Written Opinion for PCT/IB2019/060278, dated Apr. 1, 2020, 7 pages.
Indian Patent Office, First Examination Report for related IN 201841045086, dated Jul. 9, 2020, 5 pages.

* cited by examiner

REMOTE ACTIVATION OF COMMUNICATION MODULES OF SELF-POWERED INTELLIGENT ELECTRONIC DEVICES

CROSS-REFERENCE TO RELATED APPLICATIONS

This application is a U.S. national stage of International Application Serial No. PCT/IB2019/060278, filed Nov. 28, 2019, which claims priority to Indian Patent Application No. 201841045086, filed Nov. 29, 2018. The entire disclosures of both of the foregoing applications are incorporated herein by reference.

FIELD OF THE INVENTION

The present invention relates generally to an intelligent electronic device used for auto reclosers in power transmission and distribution networks. More particularly the present invention relates to remote activation of communication modules of self-powered intelligent electronic devices.

BACKGROUND OF THE INVENTION

An auto recloser protects a power distribution line, hereinafter referred to as a power line with help of a circuit breaker and thereby interrupting or opening the connection in the power line when a fault occurs on the line. An example of a fault is a line or phase current exceeding a normal value for a predefined time period that can lead to tripping. Tripping of the power line is done to isolate a fault existing on the line until resolution. Post tripping of the line, an auto recloser attempts to close the circuit breaker after lapse of a time period from the tripping of the line. However, in case the fault still exits on the line, the auto recloser trips the line again. Each time the circuit breaker of the auto recloser trips the line, the auto recloser is de-energized, and each time the circuit breaker is closed, the auto recloser is energized.

Due to such repeat energization of auto reclosers, power requirement of auto reclosers are usually higher in comparison to other protective relays. While some auto reclosers use auxiliary power (e.g. voltage transformers) for functioning, some auto reclosers are self-powered. Self-powered auto reclosers are often desired due to non-dependence on auxiliary power sources.

The operation of auto reclosers are controlled with an intelligent electronic device (IED) and in a self-power auto recloser, the IED is self-powered. A self-powered device (IED) can work without a need of an auxiliary power by extracting the required power to operate the device from the power line with help of a current transformer. In such self-powered IED, it required to have the overall scheme of operation including hardware design which required less power for its functioning. Further, self-power single phase recloser generally will get mounted on an electric pole. IED associated with auto recloser would require a means (e.g. Wi-Fi communication, Bluetooth etc.) to communicate with a handheld device that may be used by an operator to gather information from the IED. Information can be data read out like event logs, fault records and parametrization support. In a self-power device, it is important that there be efficient power management to ensure functionality of IED for various functions that are supported by the IED.

SUMMARY

An aspect of the invention provides a method for remote activation of a communication module (e.g. Wi-Fi module or a Bluetooth module) of a self-powered intelligent electronic device (IED) controlling an auto recloser. In an embodiment, the auto recloser and the IED are mounted on an electric pole of a power distribution network. Further, the IED is electrically coupled to a power line with a current sensor/current transformer to measure the current flowing in the power line and provide a trip signal to interrupt the current in the power line. The IED is self-powered from power extracted from the current sensor. In an embodiment, the auto recloser is a single phase self-powered auto recloser that protects a high voltage transmission line.

The method includes, a controller of the IED to receive an activation signal from a trigger source through an optical sensor to activate the communication module. The trigger source is positioned remotely, within a predefined distance from the IED. In an embodiment, an optical sensor of the IED detects a trigger signal provided by the trigger source, and converts the trigger signal into an electrical signal. The electrical signal is conditioned by a signal conditioning unit into an activation signal that is provided to the controller.

In an embodiment, the trigger source is a light source that generates a light signal (the trigger signal in this embodiment), which is detected by a light sensor (the optical sensor in this embodiment) provided within the IED. In another embodiment, the trigger source is an infrared (IR) source that radiates IR signal to be detected by an IR sensor placed within the IED.

The method further includes, generating a control signal for powering the communication module from a power supply module based on the activation signal. The control signal is generated upon the controller of the IED detecting the activation signal. In an embodiment, the control signal may operate a switch that controls supply of power from the power supply module to the communication module.

In an embodiment, the power supply module, may include a power extraction block (PEB), that extracts power from the current sensor to generate a third voltage signal (e.g. 250 Volts). A pair of second voltage converters, convert the third voltage signal into a second voltage signal, that is used to activate an actuator, circuit breakers, and other circuitry of the auto recloser. Further, a pair of first voltage converters convert the second voltage signal into a first voltage signal, where the first voltage signal is lesser than the second voltage signal. For example, the second voltage converter may be a 250 Volts to 24 Volts DC converter, and the first voltage converter may be a 24 Volts to 3.3 Volts DC converter. One of the first voltage converters may be designed to generate and provide the first voltage signal to the communication module, upon receipt of a control signal from the controller. Hence, upon receiving the control signal, the first voltage converter may step down the second voltage signal, generate the first voltage signal and provide it to the communication module. Accordingly, the communication module gets powered upon receiving the first voltage signal.

Further, the method includes, enabling the power supply module for powering the communication module for a duration controlled with the control signal. In an embodiment, the supply of the power to the communication module, is maintained until the control signal is provided to the first voltage converter of the power supply module. In another embodiment, the supply of power may continue for a predefind duration after providing the control signal for powering the communication module.

The method further includes, activating the communication module for communicating a plurality of data associated with the IED to a remote communication device upon enabling the power supply module for the communication module. In an embodiment, upon completion of the communication with the remote communication device, the communication module is disconnected from the power supply module, by ceasing generation of the control signal. The control signal ceases to generate when the trigger signal is stopped. Accordingly, the trigger source may be switched off, when the communication module is not required to be activated, or is no longer needed for communication.

In an embodiment, the communication module is a Wi-Fi or a Bluetooth module. Accordingly, the communication module communicates over a Wi-Fi interface or a Bluetooth interface with the remote communication module.

According to an embodiment, an intelligent electronic device (IED) for remote activation of a communication module of the IED, is disclosed. The IED controls an auto recloser that is mounted along with the IED, on an electric pole of a power distribution network. Further, the IED is electrically coupled to a power line with a current sensor/current transformer to measure the current flowing in the power line and provide a trip signal to interrupt the current in the power line upon detection of a fault condition. Further, the IED is self-powered from the power extracted from the current transformer.

The IED includes, an optical sensor to detect a trigger signal provided by a trigger source and convert the trigger signal into an electrical signal. In an embodiment, the trigger source is positioned within a predefined distance from the IED and provides the trigger signal to activate the communication module.

Further, the IED includes, a signal conditioning unit to convert the electrical signal obtained from the optical sensor into an activation signal. The signal conditioning unit may include a noise filter, to filter noise in the electrical signal. The signal conditioning unit may further include an analog to digital converter to convert the analog electrical signal into a digitized signal.

Further, the IED includes a controller that receives the activation signal from the signal conditioning unit, and generates a control signal for powering the communication module from a power supply module based on the activation signal. The controller further, enables the power supply module to power the communication module for a duration controlled with the control signal; and activate the communication module for communicating a plurality of data associated with the IED to a remote communication device upon enabling the power supply module for the communication module. Further, the controller, disables the power supply module from the communication module in absence of the activation signal.

Disclosed method and IED ensures remote activation of the communication module of the IED, coupled to an auto recloser of a power distribution network. Such remote activation facilitates conditional activation of the communication module of the pole mounted IED. Conditional activation of the communication module, further helps in reducing an overall power consumption of the IED, which in turn helps in achieving a faster switch on to failure (SOTF) time for the TED.

DETAILED DESCRIPTION

Figure 1:
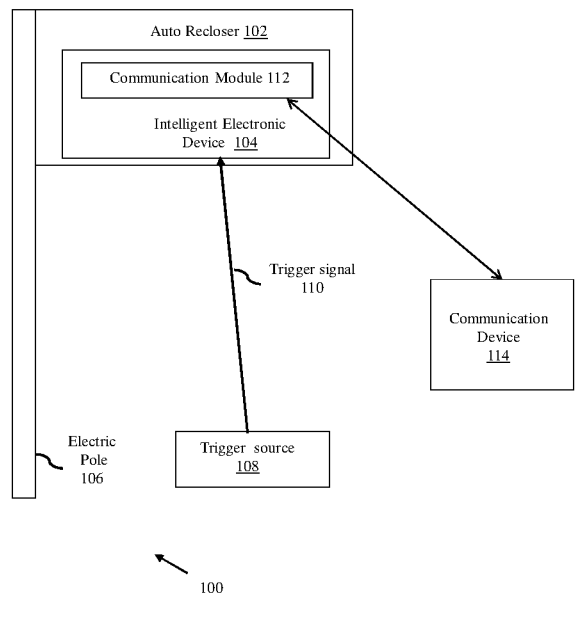
FIG. 1 is a simplified view of an environment in which various embodiments of the present invention can be practiced.

The present invention is related to remote control of an operation of a self-powered Intelligent Electronics Device (IED) such that it helps in optimizing power consumption of the self-powered/self-supplied IED used in auto recloser. The auto recloser referred to in the present invention is a pole mounted self-powered auto recloser that protects high voltage/medium voltage overhead electrical power distribution lines, hereinafter referred to as power lines.

The self-powered auto reclosers, in particular, the IED utilize energy from current sensing transformers to supply power to its various modules including providing energy to operate the circuit breakers for tripping the power lines. Therefore, the power extracted from the power lines are mainly used to power itself and to provide energy for trip.

In order to reduce power required for performing the protective functions of the auto recloser, a communication module (e.g. Wi-Fi module or a Bluetooth™ module) of the auto recloser is by default deactivated at the time of energizing i.e. no electrical power is provided to the communication module for it to function. Further, post energization of the auto recloser, the communication module is activated only when required. For example, the communication module is activated when a plurality of data such as event logs, fault records, and parameterization is required to be sent to a requesting device. For example, a handheld device (e.g. a smart phone or tablet or any other specifically designed handheld monitoring devices) can be the requesting device and the handheld device may retrieve the plurality of data via a Wi-Fi interface of the communication module. At the time of usage, there needs to be a means to provide trigger to the IED to initiate powering ON of the communication module.

Aforementioned conditional activation of the communication module, reduces an overall power requirement of the auto recloser at the time of energizing, and at the time of performing the protective functions. This also is important to keep the delay for switching on of the protective relay from power OFF state (i.e. boot up and initialization activities relating to protection function including charging to a trip capacitor that stores energy required to provide trip signal) and be ready to detect fault or normal condition immediately on powering ON at the minimum. The time for decision on tripping is referred to as a Switch On To Fault (SOTF) time parameter.

The SOTF parameter is indicative of a speed of the protective functionalities of the auto recloser. An auto recloser with a lower SOTF time is desirable, to minimize any possibility of damage due to the fault. Typically, the SOTF time includes time to initialize (boot) and the time to execute the protection algorithm used for the purpose of computing normal/abnormal condition. Accordingly, the conditional activation of the communication module, reduces the SOTF time of the self-powered auto reclosers as the power extracted from current signals are used for protection function. Various embodiments, of the present invention can be practiced in an environment, such as environment 100 shown in FIG. 1.

The environment 100, shown in FIG. 1 shows an electric pole 106, a pole mounted auto recloser 102. The auto recloser includes a self-powered intelligent electronic device (IED) 104, hereinafter referred to as IED, which includes a communication module 112. The auto recloser is mounted on the electric pole, to monitor the conditions of the electric distribution lines associated with the electric pole. There is a trigger source 108 (e.g. a torch light) to send signal to the IED to power ON communication module present in the IED for a limited time for the communication module to be able to send metered/status data to a remote device (also being referred herein as communication device or remote communication device), 114 (e.g. a handheld device carried by a field operator).

As shown, the communication module communicates with a remote device, to provide a plurality of data associated with the IED, such as event logs, fault records, and parameterization support related data. In an embodiment, the communication device is a handheld device that communicates over a Wi-Fi interface with the communication module. The plurality of data associated with the IED may be required when an operator seeks to check for fault records. As the IED is mounted on the electric pole, remote communication is a convenient means of acquiring such data.

In an embodiment, the electric pole is a pole of a high voltage transmission network, and the auto recloser is a single phase self-powered auto recloser. Further, the IED is coupled to a bottom portion of the auto recloser. The IED functions to optimize power consumption of the auto recloser based on a trigger signal 110 (e.g. light signal from a light torch) received from the trigger source.

The trigger source can be positioned at a predefined distance (e.g. 15 to 20 meters) from the IED, and transmits the trigger signal to the IED for activating the communication module. For example, the trigger source is a light source (e.g. a torch, tube light or a light emitting diode) that transmits a light signal (viz. the trigger signal) to the IED during hours of darkness. In another example, the light source can also be replaced with a mirror positioned such as to reflect sunlight or a laser type of torch can be used to transmit the light signal to the IED during hours of daylight. In another example, the trigger source may be an infrared (IR) source that radiates IR signal (viz. the trigger signal) to activate the communication module. Remote activation of the communication module of the IED, by the trigger signal is explained in detail with reference to FIGS. 2, 3, and 4.

Figure 2:
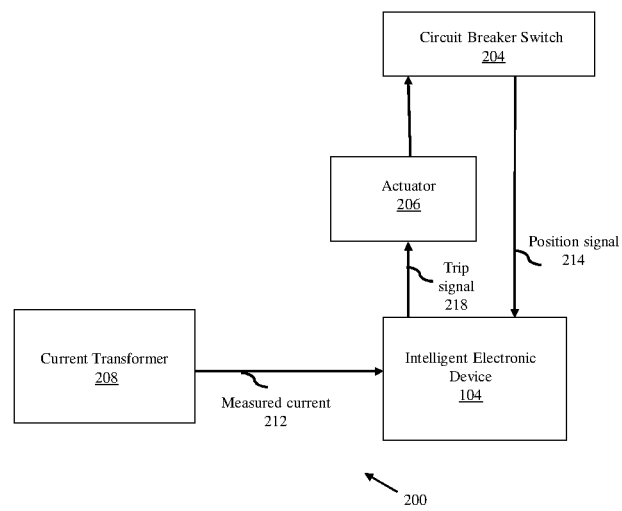
FIG. 2 is a block diagram of components of a single phase self-powered auto recloser, coupled to an intelligent control device, according to an embodiment of the present invention.

FIG. 2 is a block diagram 200 illustrating one or more components of an auto recloser (e.g. 102), coupled to an intelligent control device (e.g. 104), according to an embodiment of the present invention. As shown the one or more components of the auto recloser include a circuit breaker switch 204, mounted on an electric pole 202, a current sensor/current transformer 208, and an actuator 206 that on receiving trip signal 218 from the IED will operate the circuit breaker 204. Current is extracted from the current transformer for powering the IED and also for measurement and processing to determine fault conditions.

In absence of current 212, the IED is in an un-energized condition. When current 212 reaches a predefined threshold, the IED gets energized to generate voltage required for activating the actuator. The actuator is a device that operates the circuit breaker switch, to an open or a closed position based on detection of a fault condition on the power line that is monitored by the IED. In an embodiment, the actuator switches the circuit breaker to the open position, when a fault is detected by the IED, and to the closed positon after a lapse of predefined time interval from the opening of the circuit breaker as part of auto recloser operation. The position of the circuit breaker switch is communicated to the IED by a position signal 214, and this data is also an example of data that can be communicated to the remote device (112).

Figure 3:
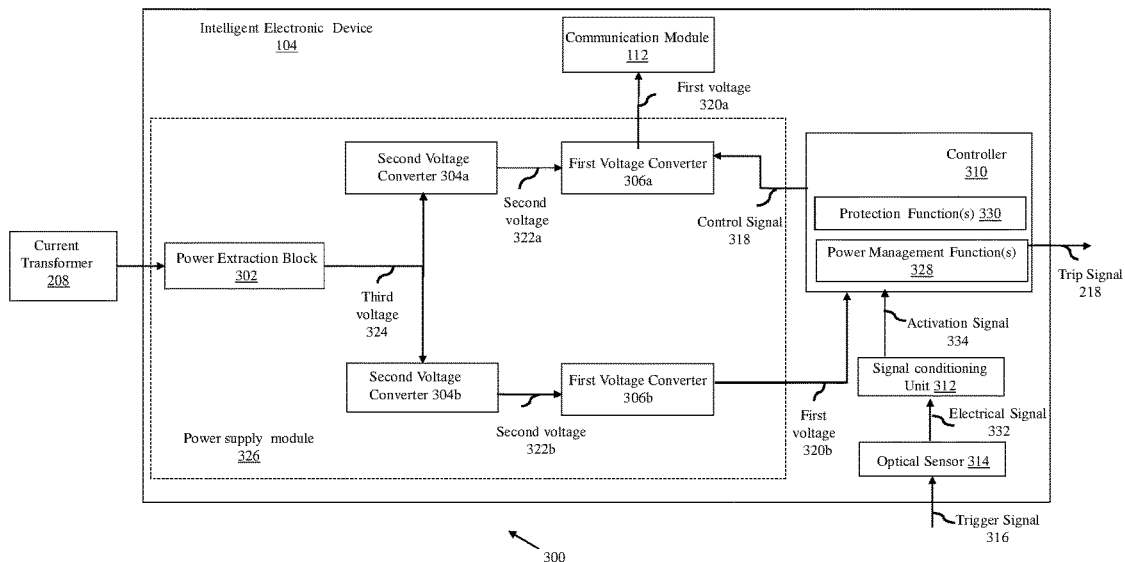
FIG. 3 is a block diagram of an intelligent electronic device (IED) used for remote activation of a communication module of the IED, according to an embodiment of the present invention.

Functioning of the IED is explained in reference to FIG. 3. FIG. 3 is a block diagram of the IED (104) used for optimizing power consumption in a self-powered auto recloser according to an embodiment of the present invention. The IED includes a plurality of modules such as a power supply module 326, a communication module 112, and a controller 310 (e.g. microcontroller with I/O and memory), a signal conditioning unit 312, and an optical sensor 314 (e.g. photo sensor). The power supply module 326 comprises a power extraction block 302 and a set of convertors to have a regulated power supply to have power supply at the level suitable to power various components of the IED. An exemplary configuration of set of converters is provided in FIG. 3 i.e. there are a pair of second voltage converters 304*a* and 304*b* to generate a power supply of a second voltage level, and a pair of first voltage converters 306*a* and 306*b* to generate a first voltage level (power supply) 320*a-b* suitable for powering the communication module and the controller respectively, and a second voltage (power supply with second voltage level) 322*a-b* is used to activate the actuator and the circuit breaker of the auto recloser. The controller is illustrated to include a power management function(s) 328 for operating the power supply module in an optimized manner to ensure self-powering and controlled charging for trip capacitors and for generating a control signal 318 that controls (for e.g. ON/OFF) the first voltage converter 306*a* thereby control power and operation of the communication module. The controller has a protection function(s) 330 for processing of measured current and determining fault conditions and issue commands for generating the trip signal 218, required for opening the circuit breaker upon detection of a fault on the power line via the actuator. Here, a person skilled in the art would recognize that the protection function 330 and the power management function 328 can be a software that is programmed in the IED or can be deployed as combination of hardware, firmware and software in the TED.

The IED can also comprise optical sensor 314 and signal conditioning unit 312 to be able to receive trigger signal (e.g. light signal from a torch carried by a field operator) and process the trigger signal to have an activation signal 334 that can be used by the controller to detect presence of trigger signal by the field operator and process further to generate control signals for controlling operation (ON/OFF) of the communication module. It can be recognized by a person skilled in the art that the optical sensor 314 and signal conditioning unit 312 can be an external unit that is interfaced with the IED i.e. the I/O of the IED receives activation signal 334 for processing by the IED. Also, here, the example is provided with an optical sensor as light is said to be the source of signal. One would recognize that there can be any wireless mode of activation (e.g. infra-red, Bluetooth etc.) i.e. any low power means for sensing and signal conditioning.

Figure 4:
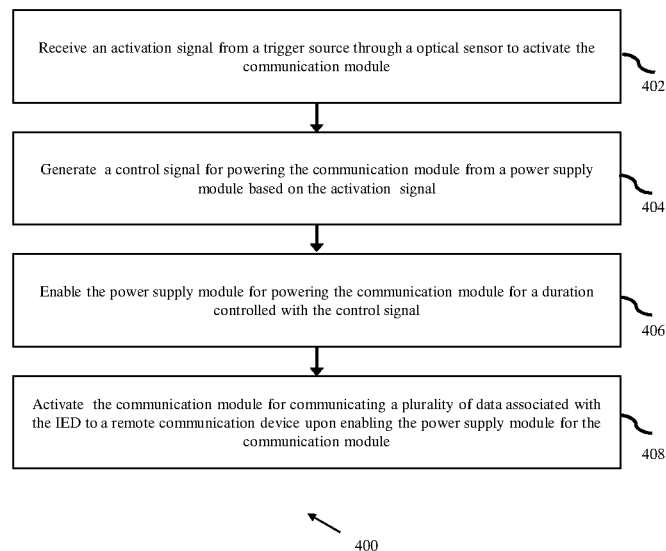
FIG. 4 is a flowchart of a method for remote activation of a communication module of a self-powered IED, according to an embodiment of the present invention.

Each of the plurality of modules of the IED performs one or more steps of a method for remote activation of the communication module of the IED, as disclosed in FIG. 4. FIG. 4 is a flowchart 400 of the method for remote activation of a communication module (e.g. 112) of an IED that controls an auto recloser in a power transmission/distribution network. In an embodiment, the auto recloser and the IED are mounted on an electric pole, of a power distribution network. The IED is electrically coupled to a power line with a current transformer to measure the current flowing in the power line and provide a trip signal to interrupt the current in the power line. The IED is self-powered from the power extracted from the current transformer. In an embodiment, the IED is electrically coupled to the auto recloser.

At 402, an activation signal (334) is received based on trigger signal generated from a trigger source (108). The activation signal can be generated from a signal conditioning unit (312) along with an optical sensor 314) to activate the communication module (308).

The trigger source is positioned within a predefined distance from the IED. For example, the trigger source may be at a distance of 15 to 20 meters from the pole mounted IED. The trigger source provides a trigger signal (316) to the IED, which is detected by the optical sensor. The optical sensor converts the trigger signal into an electrical signal (332) and provides the electrical signal to a signal conditioning unit (312). The signal conditioning unit may condition the signal to filter noise, and convert the electric signal into a digitized signal. The signal conditioning unit can also be used for measurement of current from the current transformer and the value of current can be digitized by an inbuilt analog to digital converter.

In an embodiment, the trigger source is a light source and provides light signal to activate a light sensor provided within the IED. The light sensor converts the light signal into an analog/digital electrical signal. In an embodiment, the trigger source is an infrared (IR) source, and provides IR signal to activate an IR sensor provided within the IED.

At 404, a control signal for powering the communication module from the power supply module is generated. The control signal is generated based on the activation signal upon the controller of the IED detecting the activation signal. In an embodiment, power management functions 328 of the controller, may generate the control signal to enable power to the communication module 112 based on a plurality of parameters. For example, the controller may generate the control signal for a predefined duration as suitable for communicating data from the IED to the remote device upon detecting the activation signal. In another example, the controller may generate the control signal as long as the activation signal is provided, and may cease to generate the control signal when the activation signal is not generated.

At 406, the power supply module is enabled for powering the communication module for a duration controlled with the control signal. For example, upon receiving the control signal the first voltage converter is triggered to generate the first voltage level (e.g., 3.3V) that is provided to the communication module. In an embodiment, the communication module is powered as long as the control signal is provided to the first voltage converter.

In another embodiment, the control signal can activate a switch provided between the power supply module and the communication module and the control signal can switch ON/OFF the power to the communication module. Upon activating the switch a power supply is provided to the communication module.

At 408, the communication module is activated for communicating a plurality of data associated with the IED to a remote communication device (e.g. 114) upon enabling the power supply module for the communication module. Hence, once the power supply to the communication module is enabled, the communication module may be activated for desired communication. The communication device may be a handheld device operated by a field engineer, desirous of obtaining a plurality of fault records, event logs, and parameterization data required of the IED (i.e. setting related data, for example parameters like protection function settings, communication related parameters like data rate etc.). Upon completion of the communication with the handheld device, the communication module may be disabled/disconnected from the power supply module. Such disablement is carried out by the controller, so that power consumption by the communication module is minimized.

Disclosed method optimizes an overall power consumption of self-powered IEDs used within a power distribution network. Conditional activation of the communication module (e.g. Wi-Fi module) of the IED helps reduce power requirement at the time of boot up of the IED. Consequently, protection functions that are initialized post boot up, can be activated at a lower system current, which in turn improves the SOTF time. Accordingly, an efficiency of the auto recloser in responding to faults at time of switching on, is improved. Further, as the communication module is activated only when needed, cyber security risk associated with the plurality of data of the IED is improved (reduced).

Further being a pole mounted product, it is difficult to have access to the IED for conditional activation/deactivation of the communication module and other functionalities. Hence the remote activation of the communication module as disclosed in the present invention, overcomes the difficulty in accessing the pole mounted IED. Conditionally activating the communication module (Wi-Fi module) of the pole mounted IED, on a remote basis by using light source or any other suitable optical source, helps achieve remote activation.

We claim:

1. A method for remote activation of a communication module of a self-powered intelligent electronic device (IED) controlling an auto recloser, wherein the auto recloser and the TED are mounted on an electric pole of a power distribution network, wherein the TED is electrically coupled to a power line with a current transformer to measure a current flowing in the power line and provide a trip signal to interrupt the current in the power line, and wherein the TED is self-powered from power extracted from the current transformer, the method comprising, using a controller of the TED:

receiving an activation signal from a trigger source through an optical sensor to activate the communication module, wherein the trigger source is positioned within a predefined distance from the TED;

generating a control signal for powering the communication module from a power supply module based on the activation signal, wherein the control signal is generated upon the controller of the IED detecting the activation signal;

enabling the power supply module for powering the communication module for a duration controlled with the control signal; and activating the communication module for communicating a plurality of data associated with the TED to a remote communication device upon enabling the power supply module for the communication module.

2. The method of claim 1, wherein the power supply module is enabled for powering the communication module as long as the control signal is provided to the power supply module.

3. The method of claim 1, wherein the power supply module is enabled for powering the communication module for a predefined duration post provision of the control signal to the power supply module.

4. The method of claim 1, wherein the optical sensor is configured to receive a trigger signal from the trigger source, and convert the trigger signal into an electrical signal, and wherein the electrical signal is processed into the activation signal by a signal conditioning unit within the IED, and wherein the activation signal is provided to the controller.

5. The method of claim 1, wherein the communication module is one of a Wi-Fi module or a Bluetooth module.

6. The method of claim 1, wherein the activation signal is a light signal, and the trigger source is a light source.

7. An intelligent electronic device (IED) for remote activation of a communication module of the TED, wherein the IED controls an auto recloser, wherein the auto recloser and the IED are mounted on an electric pole of a power distribution network, wherein the TED is electrically coupled with a power line with a current transformer to measure a current flowing in the power line and provide a trip signal to interrupt the current in the power line, and wherein the TED is self-powered from the power extracted from the current transformer, the TED comprises:
    an optical sensor configured to detect a trigger signal provided by a trigger source, and convert the trigger signal into an electrical signal, wherein the trigger source provides the trigger signal to activate the communication module, and wherein the trigger source is positioned within a predefined distance from the TED;
    a signal conditioning unit configured to convert the electrical signal obtained from the optical sensor into an activation signal; and
    a controller configured to:
        receive the activation signal from the signal conditioning unit;
        generate a control signal for powering the communication module from a power supply module based on the activation signal;
        enable the power supply module to power the communication module for a duration controlled with the control signal; and
        activate the communication module for communicating a plurality of data associated with the IED to a remote communication device upon enabling the power supply module for the communication module.

8. The IED of claim 7, wherein the controller is configured to:
    disable the power supply module from the communication module in absence of the activation signal.

9. The IED of claim 7, wherein the optical sensor is a light sensor and the trigger signal is a light signal provided by a light source.

10. The IED of claim 7, wherein the optical sensor is an infrared (IR) sensor and the trigger signal is an IR signal provided by an IR source.

11. The method of claim 1, wherein the activation signal is an infrared signal, and the trigger source is an infrared source.

* * * * *